United States Patent [19]

Brown

[11] Patent Number: 4,727,390

[45] Date of Patent: Feb. 23, 1988

[54] CAMERA MOUNTING BRACKET

[76] Inventor: Melvin W. Brown, 2133 Glen Heather Way, Las Vegas, Nev. 89102

[21] Appl. No.: 64,543

[22] Filed: Jun. 22, 1987

[51] Int. Cl.⁴ ............................................. G03B 29/00
[52] U.S. Cl. ......................................................... 354/82
[58] Field of Search .......................................... 354/82

[56] References Cited

U.S. PATENT DOCUMENTS

| 4,081,814 | 3/1978 | Bulland | 354/82 X |
| 4,177,967 | 12/1979 | Marchus | 354/82 X |
| 4,327,986 | 5/1982 | Carter | 354/82 X |

*Primary Examiner*—Michael L. Gellner
*Attorney, Agent, or Firm*—Seiler, Quirk & Tratos

[57] ABSTRACT

A camera mounting and steadying device for reducing or eliminating undesired movements of a hand-held camera consisting of a main support handle member with hand grips formed into each end of the frame. A camera mounting base is located at one end of the frame and is attached at 90° to two parallel rails that are contained in and slide in channels on either side of the main frame, and is adjustable in multiple directions to enable eye alignment. A shoulder brace extends rearwardly from between the grips of the main frame and abuts either shoulder of the operator. The shoulder brace is both automatically adjustable at the shoulder and manually adjustable for the photographer's comfort. In addition, the shoulder brace may be configured as a tripod to provide stabilization to mount the unit on a flat surface. A camera shutter release is provided in the proximity of the index finger of one hand and a hand support flange extends rearwardly and is positioned to rest on top of the user's lower hand for additional steadying and support. The entire unit is designed to operate so that when pulled into the shoulder by the hands, unwanted movements and vibration are effectively dampened and/or eliminated.

11 Claims, 10 Drawing Figures

CAMERA MOUNTING BRACKET

BACKGROUND OF THE INVENTION

This invention relates to a portable hand-held mounting bracket for a camera which interacts with a photographer's body to stabilize the camera. More particularly, this device relates to a lightweight device that is attached to a camera and held in the operator's hands while at the same time abutting the operators shoulder.

When taking photographs it is usually desirable to completely stabilize the camera with a tripod or similar device. However, a photographer who is afoot in the field and searching for candid shots must maintain mobility, sometimes at the expense of steadiness. Likewise, after a long or exhausting sojourn, a seemingly lightweight camera unit can suddenly become burdensome and impossible to steady. In addition, special circumstances arise, as when using a telephoto lens or shooting in low light conditions that require long exposure times and hence a very steady "hold."

The present invention provides a method of eliminating or reducing the movement of a hand-held camera while shooting pictures and, at the same time, giving the operator complete freedom of movement in the field. The invention is a lightweight portable device for mounting and steadying a camera having hand grips that allow an operator to grasp the bracket and pull it toward his body, thereby supporting and steadying the camera. In general, the invention consists of an elongated, rectangular frame member that contains integral spaced grips shaped and a camera mounting base attached at the upper end that is adjustable both vertically and axially. In addition, a shoulder brace is attached to the rectangular frame member between the grips and extends rearwardly and terminates in a C-shaped support adopted to adapt either shoulder of the operator. A trigger for activating the camera shutter is mounted in the frame member adjacent either grip, preferably the lower grip. The bracket is used by the photographer by grasping the hand grips with both hands, placing the shoulder support in place, and pulling the bracket toward the body. This triangulation effect between the photographer's arms and the shoulder brace reduces or completely eliminates the undesired movement of a camera.

Past attempts to develop apparatus for steadying cameras have been confined to tripods that rest on the ground such as the Kirby patent, U.S. Pat. No. 2,559,971 or devices that are held in one hand and contain an arm or arms that abut some part of the operator's body such as Fernelius, U.S. Pat No. 3,105,430,; Tolcher, U.S. Pat. No. 2,753,778; Marchus, U.S. Pat. No. 4,177,967 and Adams, U.S. Pat. No. 4,306,790.

All of the devices with multiple braces or braces that rest on the ground are not adapted to mobile operation since they cannot effectively adapt to different orientations of the operator terrain without readjusting the stabilizing or supporting arm or arms.

The present device is most effectively used by pulling the handle toward the user's body and squeezing the elbows toward the rib cage of the operator. This configuration effectively triangulates and stabilizes the camera and substantially reduces or eliminates any undesired movement.

SUMMARY OF THE INVENTION

A device for steadying a camera comprising an elongate rectangular frame member with integral hand grips at either end and a camera mounting base at one end that is adjustable vertically and horizontally to communicate with the operator's eye. A brace for abutting the shoulder is adjustably mounted in the frame between the grips and is automatically pivotally adjustable to accommodate changes in the tilt angle of the camera. A trigger for activation of the camera shutter is located in the frame of the lower grip.

DETAILED DESCRIPTION OF THE INVENTION

Figure 1:
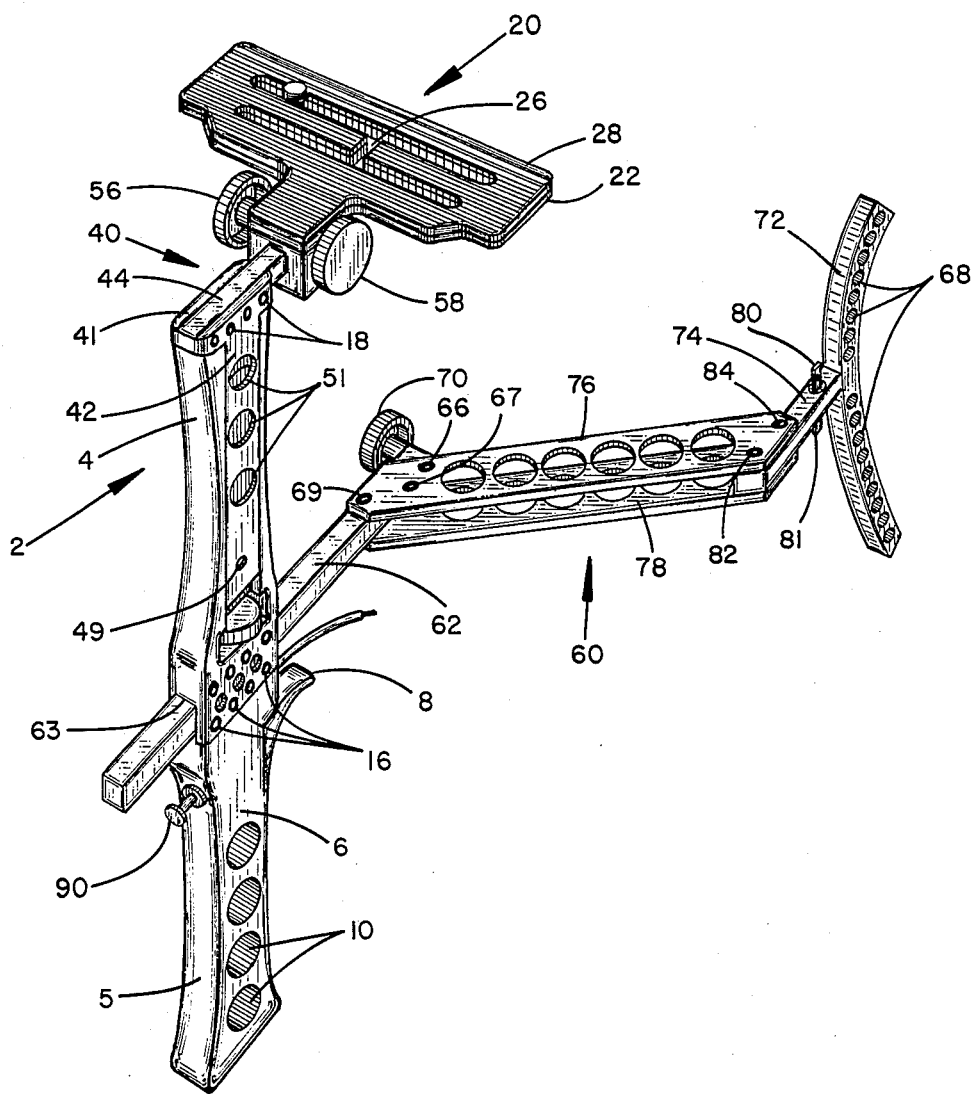
FIG. 1 is a perspective view of the support bracket of this invention showing the shoulder brace positioned to abut the left shoulder of the photographer.

Referring to FIG. 1, the mounting bracket of the invention consists generally of frame or handle member 2 which comprises a base to which the various components of the bracket are attached, camera mounting plate 20, "T" slide 40 and brace 60. The components of the invention or "pod assembly" work in combination to provide an adjustable, ambidextrous system for holding a camera or other object in a "rock steady" manner as might be required when taking action photographs.

Specifically, as shown in FIG. 1, brace 60 consists of rod 62, C-shaped curved butt 72, link 74, and parallel spanners 76 and 78. Butt 72 is square in cross-section and curved at a radius of approximately 4¾" to provide a comfortable shoulder-engaging brace for the bracket. A plurality of equally spaced bores 68, (eighteen in the embodiment shown) are equally spaced, 9 at either end of the butt as shown in FIG. 1. The holes are approximately ¼" in diameter, are chamfered at both ends and are located so that their axis is parallel to the surface that abuts the operator's shoulder. These holes reduce the weight of the bracket and make it easier to operate.

Figure 9:
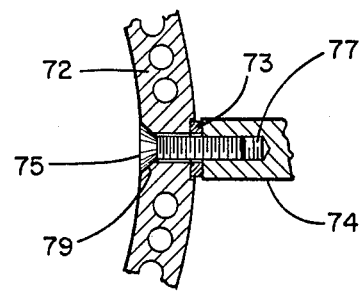
FIG. 9 is a partial side cutaway view of the shoulder mount.

Link 74 is connected on one end to butt 72 by a flathead counter-sunk screw (not shown) that extends through butt 72 and communicates with threads cut into the end of link 74. Plastic friction washer 73 (see FIG. 9) is inserted between butt 72 and link end 74 which allows butt 72 to rotate when sufficient torque is applied; the amount of force required to rotate butt 72 is dependent on the torque applied to the countersunk screw and if desired, the butt can be prevented from rotating by completely tightening the screw. The adjustability of the butt compensates for changes in the angle between the camera and shoulder and contributes to both adaptability and comfort.

Figure 2:
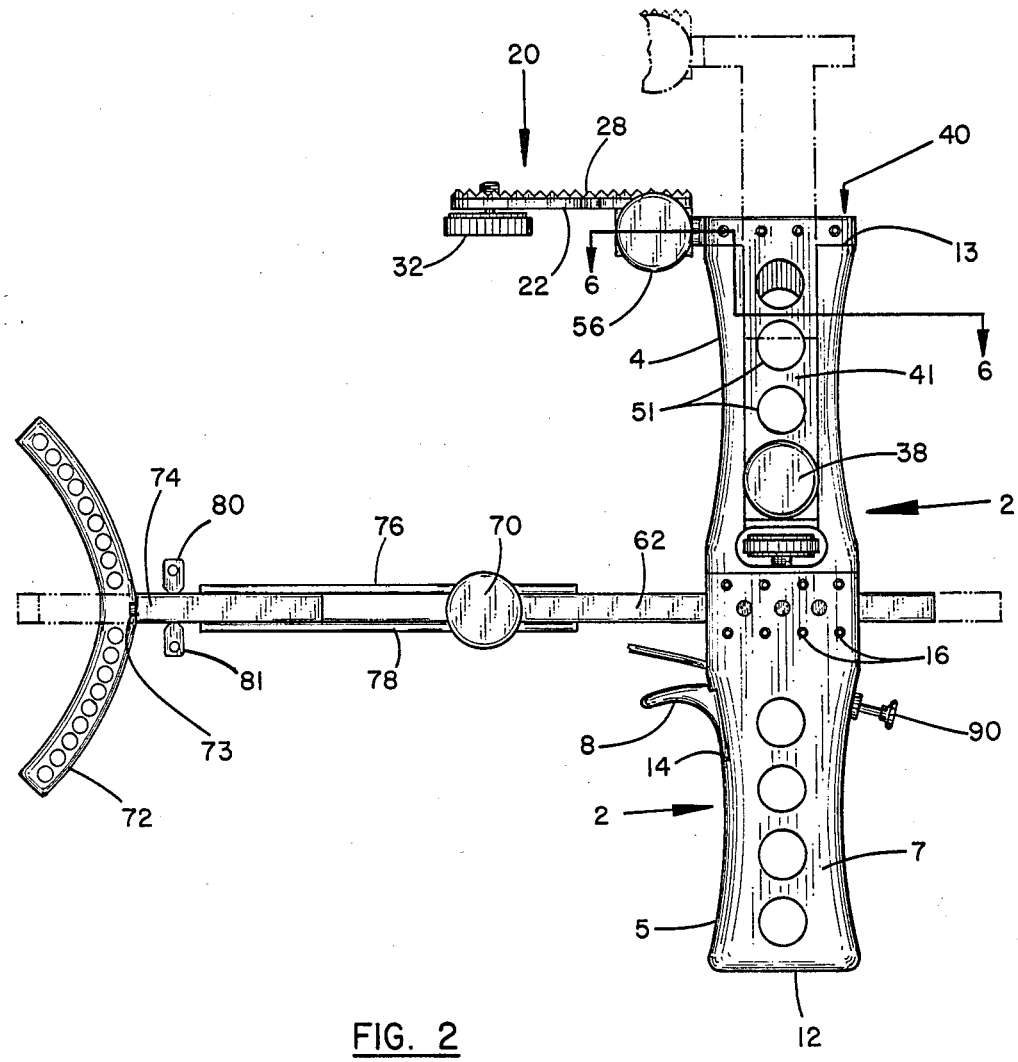
FIG. 2 is a right side elevation of the bracket as shown in FIG. 1.

This feature is also important when the invention is used as a mount for a flat surface, (see FIG. 8) as when taking a self-portrait. In this mode, brace 60 is positioned in frame 2 so that brace 60 extends downwardly and rearwardly. Butt 72 is rotated. The screw that connects butt 72 and link 74 must be sufficiently tight to prevent the butt from easily rotating. In this mode, the invention assumes a very stable, triangulated three-point stance and can be effectively used for hands-off operation without fear of overturning. Link 74 also contains eyelets 80 and 81 screwed into threads located on opposite sides of link 74 as shown in FIGS. 1 and 2. The eyelets can be utilized for attaching a carrying strap to prevent the device and camera from being dropped.

Figure 3:
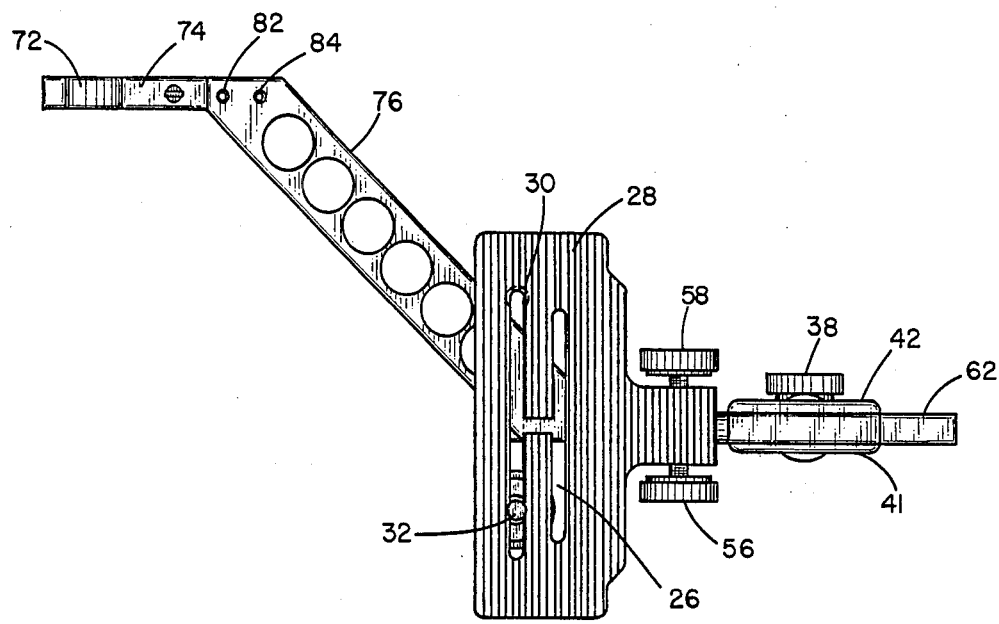
FIG. 3 is a plan view of the bracket.

The opposite end of link 74 is attached by roll pins 82 and 84 (see FIG. 3) to spanners 76 and 78 and separates and maintains the spanners in substantially parallel configuration (see FIGS. 1, 2 and 3). Roll pins are used throughout the invention as fastening means. When two or more pieces are to be joined permanently, they are aligned in the desired configuration and a single continuous hole is formed, as by drilling, through all pieces to be joined. The diameter of the hole formed is less than the diameter of the roll pin to be used. The roll pin is then pressed into the hole effecting an interference fit, the friction caused thereby holding the pieces permanently in alignment.

Each spanner contains a plurality of equally spaced holes in substantially parallel configuration with the holes offset towards link 74. The spanners are approximately 1" wide and ⅛" thick and have a median length of approximately 6-7/16".

Rod 62 and link 74 have a square cross section of approximately ⅜", are located in substantially parallel configuration (see FIGS. 1 and 2) and are approximately 4¼" apart.

Rod 62 slideably engages square opening 63 of frame 2 (see FIG. 4) thereby allowing the entire brace 60 to be forwardly or rearwardly adjusted (see FIG. 1 and FIG. 2). Once the desired positioning is found, thumbscrew 86 (which is screwed into threads 88 of frame 2) is tightened so that the end of knob 86 jams against rod 62 and prevents rod 62 from moving (see FIG. 4). In addition, rod 62 can be completely removed from frame 2 and rotated at 90° intervals to adapt the invention to left-shoulder mode, right-shoulder mode or flat-surface mount mode.

Figure 5:
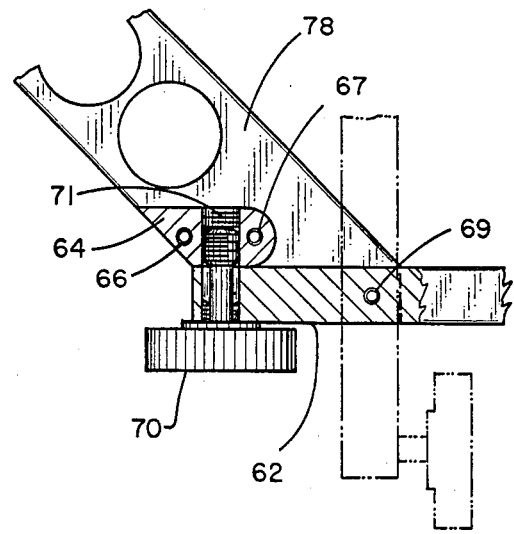
FIG. 5 is a cross-sectional view of the folding shoulder brace locking mechanism.

Another feature of brace 60 is its ability to be folded when not in use. This foldable feature is located at the connection point between rod 62 and spanners 76 and 78 (see FIG. 5). Block 64 is located and permanently fastened to spanners 76 and 78 by roll pins 66 and 67. Rod 62 is located between spanners 76 and 78 but only by a single roll pin 68 thereby allowing rod 62 to pivot relative to spanners 76 and 78. When thumbscrew 70 is screwed into threads 71 located in block 64, rod 62 is locked and cannot pivot. By unscrewing knob 70, rod 62 is unlocked from spanner 76 and 78 and can be pivoted about the axis of roll pin 69. The broken lines in FIG. 5 show rod 62 in a partially pivoted position.

Figure 6:
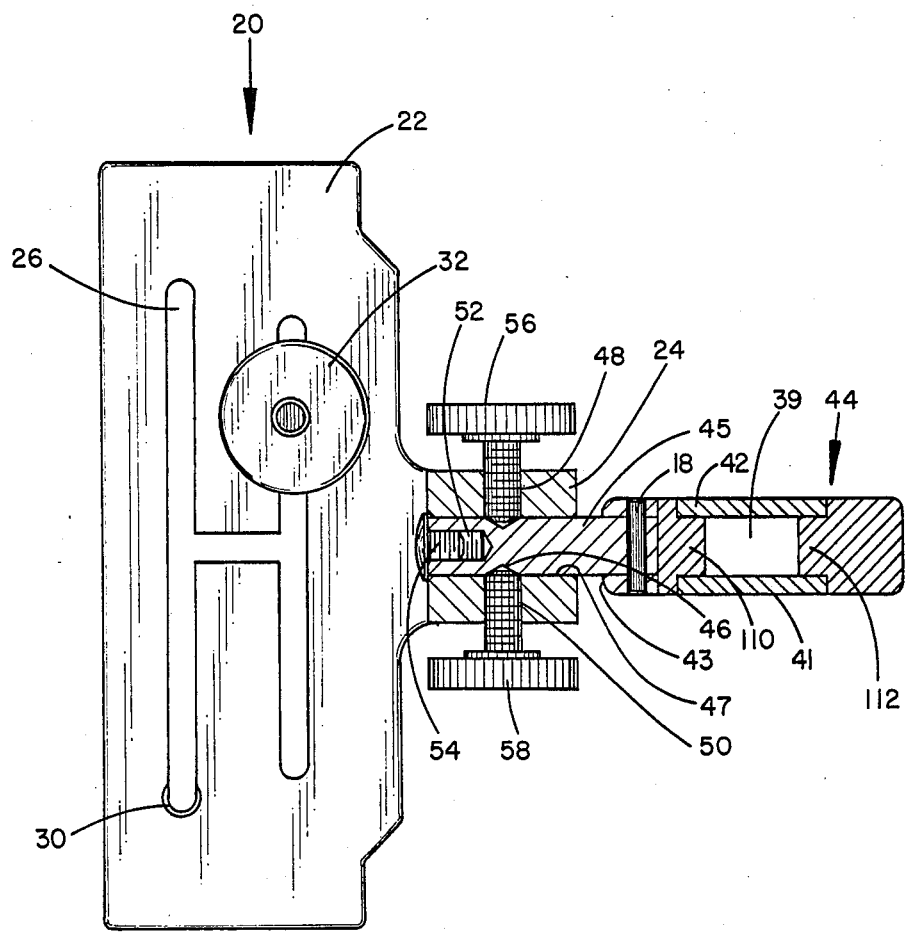
FIG. 6 is a bottom cross-sectional view of the camera mounting plate assembly and locking mechanism.

Camera mounting plate assembly or base 20, shown in FIG. 1 consists of plate 22 (see FIGS. 7 and 8) and block 24. Plate 22 is approximately rectangular in shape (approximately 5" long, 2" wide and ⅛" thick) and contains an "H"-pattern slot 26 formed through plate 22 (see FIG. 6). Corrugated rubber pad 28 is glued to, and is coextensive with, the upper surface of plate 22 (see FIGS. 1, 7, and 8). As shown in FIG. 6, one end of "H" pattern slot 26 contains threaded hole (SAE ¼"×20) 30. The width of slot 26 is smaller than the major diameter of the threads on thumbscrew 32 but larger than the diameter of the rest of the shaft which has been turned down (see FIGS. 4 and 5 for a typical thumbscrew). As a result, thumbscrew 32 can be fitted into slot 26 by insertion into hole 20 until all the threads of thumbscrew 32 have passed through the hole. Thumbscrew 32 can then move laterally in slot 26 but cannot be removed unless screwed back out of hole 30.

Plate 22 contains a tab or neck along one side that is fastened to block 24 by four counter-sunk, flathead screws (not shown), one at each corner of block 24 screwed into threads located in block 24.

As shown in FIG. 6, journal 45 of block 44 is circular in crosssection and contains "V"-groove 46 in the center of its length extending completely around journal 45. The end of journal 45 contains a 10×32 SAE threaded bore 52. Block 24 contains bore 47 and two ¼×20 SAE threaded holes 48 and 50 arranged at 90° to bore 47 and 180° to each other.

Figure 7:
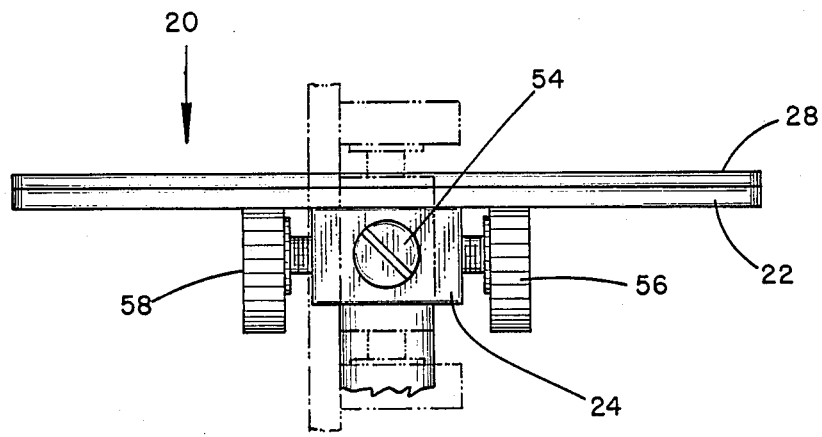
FIG. 7 is a rear elevation of the camera mounting base plate asembly.

Bore 47 of block 24 is slideably engaged over journal 45 and secured by 10×32 SAE screw 54 screwed into threads 52. When screw 54 is in place block 42 can be rotated about journal 45 but cannot be axially removed. Shoulder 43 acts as a stop to limit block 24 travel at the opposite end. Locking thumbscrews 56 and 58 are screwed into threadholes 48 and 50 respectively and tightened into "V"-groove 46 locking base plate assembly 20 at any desired angle. FIG. 7 shows base plate assembly 20 in the horizontal position and (in phantom) in a position rotated 90° counter-clockwise.

As shown in FIG. 1, two T-slides 41 and 42 comprise a support arm for the camera mounting base and are located on either side of block 44 and fastened to block 44 by roll pins 18. As assembled, block 44 and T-slides 41 and 42 form a rigid 90° connection that maintains both T-slides in substantially parallel configuration. The T-slides are identically shaped and approximately 4" long, 1" wide at the bottom, 2" wide at the top and ⅛" thick. Each T-slide contains bores 51 approximately ⅜" in diameter equally spaced along its side and threaded bore 49 (SAE ¼"×28) located approximately ¼" from the bottom edge of the T-slide as shown in FIG. 1. These holes contribute to both lightness and aesthetic appeal. T-slides 41 and 42 are slideably fitted into guide means or channels formed in handle member 2. The guide means are formed by longitudinal runners or projections 100 and 102 which provide support surfaces for the T-slides. T-slide assembly 40 can be fitted onto handle member 2 so that base plate assembly 20 faces either forwardly or rearwardly. Selection of either position depends on the weight and weight distribution of the camera or other device to be mounted on base plate assembly 20. A camera with a long, heavy telephoto lens having its own mounting bore would probably require the forwardly position to adjust the camera comfortably to the user's eye. For most applications, it would be used in the rearward position. Each channel is just slightly wider and longer than the width and length of T-slides 41 and 42. The depth of each channel is the same as the thickness of the T-slides. When assembled onto frame 2, T-slides 41 and 42 and handle 2 form an essentially homogeneous outer surface. The T-slides, however, can be locked at any vertical position by tightening thumbscrew 38 (shown in FIG. 2) screwed into threaded hole 49 (shown in FIG. 1), causing the slides to frictionally grip the runners 110 and 112. A detail of the tightening mechanism is shown in FIG. 4 (upper).

Figure 4:
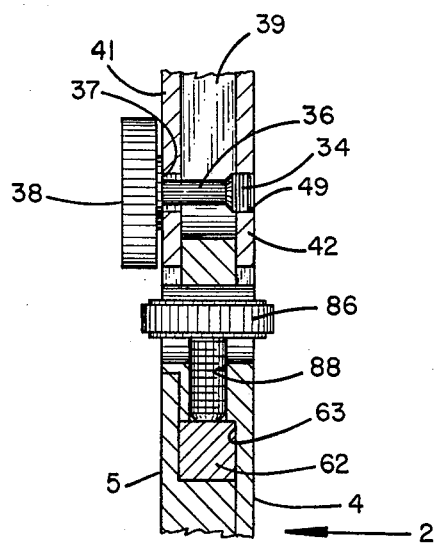
FIG. 4 is a cross-sectional detail of the shoulder brace rod locking mechanism (bottom) and the "T"-slide adjusting mechanism, (top)

As shown in FIG. 4, threads 34 of thumbscrew 38 are screwed into threaded base 49 of T-slide 42. Upon tightening, T-slides 41 and 42 are squeezed together by the action of shoulder 37 and threads 34. The squeezing action locks T-slides 41 and 42 onto the channels of handle member 2 preventing any relative movement. Elongated slot 39 is formed in frame 2 to provide clearance for shaft 36 when shaft 36 is slideably adjusted up and down. Slot 39 is approximately 11/16" wide and 2¾" long with the ends curved on a radius of 11/32". Vertical adjustment is approximately 2⅜".

Handle assembly 2, shown in FIG. 1 and FIG. 2, is comprised of an upper hand-grip portion 4 and a vertically spaced lower hand-grip portion 5, joined by roll-pins 16. Handle member 2 is approximately 9½" long and ⅝" thick with sides 6 and 7 flat and substantially parallel. As shown in FIG. 2, the top, middle and bottom widths of the frame are approximately 2". The width between the top and middle and between the middle and bottom is represented by smooth, continuous curves that provide comfortable grips for the user's hands. The minimum width is approximately 15/16". All contours are rounded and brushed to provide a comfortable feel for the operator.

When assembled, square hole 63 is formed in the center of handle 2 at the juncture of the upper and lower grip portions into which rod 62 of brace 60 is inserted (see FIGS. 1 and 4). Lug or flange 8, which serves as a hand-orienting guide and as a lever arm to maneuver handle 2 is fitted into slot 14 (see FIG. 2) formed in lower handle 5 and fixed into place by a flat-head, counter-sunk allen head screw (not shown) screwed into threads formed in lower handle 5. The shape of flange 8 is smooth and curved and approximates the shape of the top of the hand between the thumb and index finger. In operation the flange serves to distribute the weight of the bracket and camera onto the top of the hand and to provide additional steadying means for the invention.

Figure 8:
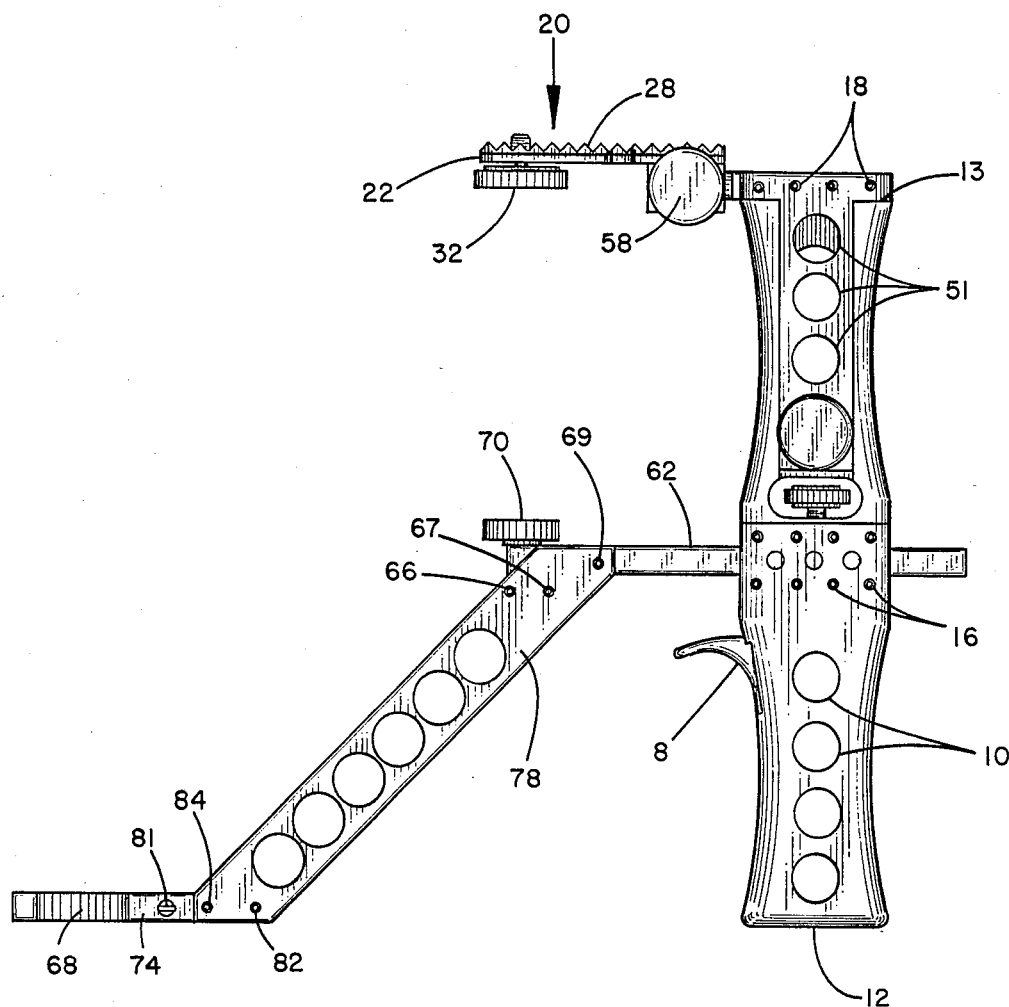
FIG. 8 is a right side elevation of the invention in the "flat-surface mount" mode.

Cable shutter release 90 or trigger means for remotely actuating the camera, shown in FIGS. 1 and 2, is mounted in a bore (not shown) in handle member 2 and is positioned so that when gripped by the hand, the index finger comfortably engages the trigger end (see FIG. 2). If desired, the trigger may be mounted adjacent the upper hand grip rather than the lower grip as shown in the drawings, but is preferably mounted adjacent the lower grip. The other end of cable shutter release 90 extends rearwardly above flange 8 and makes an angle of approximately 30° with the axis of handle 2, attaching to the shutter release button on the camera. The shutter release cable is conventional. Bottom surface 12 (see FIG. 8) of frame 2 is flat so that in the tripod or "table mount" configuration bottom surface 12 is in continuous contact with a table or other flat supporting surface. Bottom surface 12 also contains a threaded hole 1¾×20 SAE (not shown) for attachment of any "special effect" apparatus. Top surface 13, see FIG. 8, is flat and substantially parallel with bottom surface 12. Transverse bores 10 are arranged in parallel configuration in lower handle 5 and are approximately ⅝" in diameter for weight reduction and aesthetic appeal (see FIG. 1).

Figure 10:
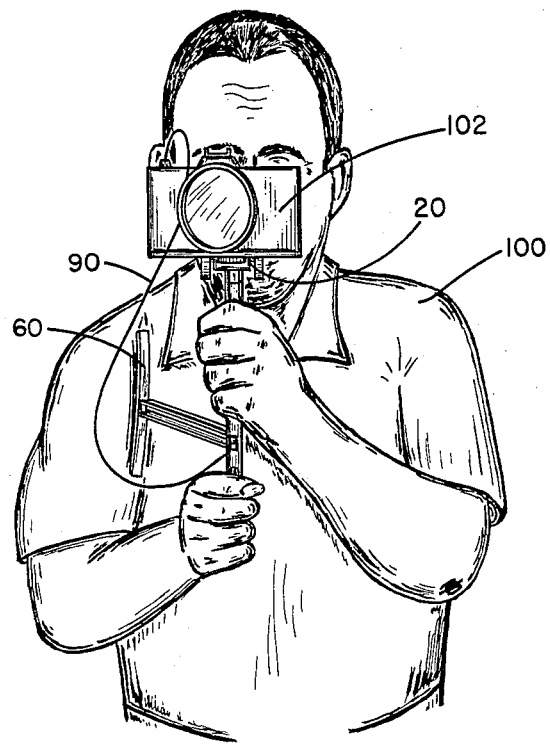
FIG. 10 is a front view of a photographer showing the manner in which the bracket of the invention is used.

Use of the bracket is best seen in FIG. 10, which shows a photographer taking a photograph using the bracket of the invention. The photographer 100 has mounted a camera 102 on the bracket as previously described and has connected cable shutter release 90 to the camera. The bracket is held by grasping the upper grip 4 with his left hand and the lower grip 5 with his right hand, and placing the shoulder brace 60 against his right shoulder. If the left shoulder is preferred, brace 60 is inserted 180° from that shown in FIG. 1. In either case, brace 60 will abut the operator's shoulder when in use. The vertical height of base plate 20 is then adjusted by slideably positioning T-slide 40 up or down and locking into position by tightening thumbscrew 38. FIG. 2 shows base plate 20 in the lowermost position and in the uppermost position (in phantom). After the camera is properly positioned, the photographer's elbows of both arms are drawn in toward his rib cage as shown by FIG. 10. By pulling the handle inwardly toward his shoulder and pressing the arms in toward his sides, a photographer achieves a rigid, steady base for taking pictures without undesired camera movement.

In the preferred embodiment the bracket can range in height from approximately 10¼" to approximately 12¾" depending on the height adjustment of base plate assembly 20. All roll pins, all eyelets, screws and threaded portions of thumbscrews are stainless steel. All knobs of thumbscrews are plastic except thumbscrew 86, which is aluminum; corrugated pad 28 is rubber. Every other component of the invention in the preferred embodiment is 6061-T6 aluminum and has a lightly brushed finish. The entire unit weighs approximately 1 pound. Other embodiments including anodizing, exotic wood handle inserts and custom engraving are envisioned.

Accordingly, the invention should not be limited by the description of the foregoing specific embodiments thereof, since many variations and adaptations thereof will be apparent to those skilled in the art, but should be limited only by the following claims.

I claim:

1. A hand-held apparatus for mounting and steadying a camera comprising:
   a handle member having first and second vertically spaced hand grips,
   camera mounting means for attaching a camera at an upper portion of the handle member,
   shoulder support means for engaging a user's shoulder, said support means comprising a rearwardly extending arm removably mounted to the handle member between the hand grips, adjustment means for selectively varying the length of the arm and a shoulder brace member mounted on the arm and adapted to abut the user's shoulder, and
   trigger means for actuation of the camera mounted in the handle member adjacent to a hand grip.

2. The apparatus of claim 1 wherein the camera mounting means comprises a base mounted at an upper portion of a base support arm, attachment means for connecting the base support arm to the handle, and height adjustment means for selectively varying the height of the base above the handle.

3. The apparatus of claim 2 wherein the base support arm slideably engages guide means in the handle member, and the apparatus also comprises stop means for releasably locking the base support arm at various locations along the guide means.

4. The apparatus of claim 1 wherein the shoulder brace member comprises an arcuate member adapted to conform to a user's shoulder, and the shoulder brace member is rotatably connected at a central portion of the brace member to an end portion of the arm.

5. The apparatus of claim 1 wherein the arm of the shoulder support means comprises a first portion adapted to slideably engage the handle member and a second portion hingedly attached to the first portion, and fastening means for selectively locking the hinge to preclude relative movement between the first and second portions.

6. The apparatus of claim 4 wherein the arm has an end portion having a rectangular cross-section and is adapted to slideably engage a transverse opening in the handle member, and second fastening means for locking the end portion in the opening at a selected position along the end portion.

7. The apparatus of claim 1 also comprises a hand-engaging support extending rearwardly from the handle member intermediate the upper and lower hand grips.

8. The apparatus of claim 7 wherein the hand-engaging support comprises a downwardly curved finger having a lower surface adapted to engage a user's hand between its thumb and index finger.

9. The apparatus of claim 1 wherein said trigger means comprises finger-operated actuating means mounted in a central portion of the handle, said actuating means including a forwardly projecting biased member adapted to be actuated by a user's index finger and a cable connected to the biased member.

10. A hand-held apparatus for mounting and steadying a camera comprising:

a handle member having first and second vertically spaced, contoured hand grips, camera mounting means including a plate extending substantially perpendicularly from an upper portion of the handle member, and threaded fastening means for connecting a camera to the plate, telescopically adjustable mounting means attaching the plate to the handle member, shoulder support means for engaging a user's shoulder comprising an arm extending rearwardly from the handle member, said arm being slideably mounted in an aperture in the handle member, fastening means for locking the arm in position in the handle member, and shoulder-engaging means comprising a rigid curved brace member rotatably mounted at an end portion of the arm, a hand-engaging support extending rearwardly from the handle member intermediate of the upper and lower hand grips comprising a downwardly curved finger having a lower surface adapted to engage a user's hand, and remote shutter actuation means comprising a cable attachable to a camera mounted on the plate and a trigger mounted in the handle member adjacent the lower hand grip for actuating the cable.

11. A method of mounting and steadying a camera comprises:

mounting a camera on a horizontal mounting plate attached to an upper portion of a handle member having first and second vertical spaced grips and also having a shoulder-engaging brace member extending rearwardly from the handle member, said shoulder-engaging brace member comprising an arm attachable to the handle member and a curved brace adapted to engage a user's shoulder, said curved brace being rotatably mounted at an end portion of the arm, said apparatus also comprising a cable release member adjacent one of the grips, placing the shoulder-engaging brace against a user's shoulder, grasping the handle member with each hand being placed on a grip on the handle member, drawing the user's elbows in toward the user's ribcage, urging the apparatus toward the user's body by drawing the handle member toward the user's shoulder, and actuating the cable release means.

* * * * *